US008821339B2

(12) United States Patent
Shinya et al.

(10) Patent No.: US 8,821,339 B2
(45) Date of Patent: Sep. 2, 2014

(54) POWER TRANSMISSION DEVICE

(75) Inventors: Masashi Shinya, Saitama (JP); Takashi Tamura, Morioka (JP)

(73) Assignee: Tamron Co., Ltd., Saitama-shi (JP)

( * ) Notice: Subject to any disclaimer, the term of this patent is extended or adjusted under 35 U.S.C. 154(b) by 460 days.

(21) Appl. No.: 13/148,158

(22) PCT Filed: Jan. 29, 2010

(86) PCT No.: PCT/JP2010/051250
§ 371 (c)(1),
(2), (4) Date: Aug. 5, 2011

(87) PCT Pub. No.: WO2010/090140
PCT Pub. Date: Aug. 12, 2010

(65) Prior Publication Data
US 2011/0290053 A1    Dec. 1, 2011

(30) Foreign Application Priority Data
Feb. 5, 2009    (JP) ................................. 2009-024757

(51) Int. Cl.
*F16H 3/44*    (2006.01)
(52) U.S. Cl.
USPC ............ 475/342; 475/294; 475/298; 475/302
(58) Field of Classification Search
USPC ................................................ 475/293, 294
See application file for complete search history.

(56) References Cited

U.S. PATENT DOCUMENTS 4,043,226 A * 8/1977 Buuck ........................ 475/158
2006/0022108 A1   2/2006 Kuga

FOREIGN PATENT DOCUMENTS

| JP | 64 49739 | 2/1989 |
| JP | 8 210444 | 8/1996 |
| JP | 10 115760 | 5/1998 |
| JP | 2004 109392 | 4/2004 |

OTHER PUBLICATIONS

International Search Report issued May 11, 2010 in PCT/JP10/051250 filed Jan. 29, 2010.

* cited by examiner

*Primary Examiner* — Erin D Bishop
(74) *Attorney, Agent, or Firm* — Oblon, Spivak, McClelland, Maier & Neustadt, L.L.P.

(57) ABSTRACT

A sun gear member, planetary gear members, a first ring gear member, and a second ring gear member together form a paradox gear mechanism. A clutch mechanism is disposed between an input gear member and the first ring gear member. The clutch mechanism rotates the first ring gear member, when the input gear member rotates. The clutch mechanism disconnects transmission of the power to the input gear member when the first ring gear member rotates. The sun gear member and the first ring gear member are individual input elements. When one of the sun gear member and the first ring gear member exclusively rotates, the second ring gear member rotates in accordance with the rotation. The sun gear transmits power more reliably without increasing manufacturing cost and without thwarting downsizing of the product.

4 Claims, 4 Drawing Sheets

POWER TRANSMISSION DEVICE

FIELD

The present invention relates to a power transmission device and, more particularly, a power transmission device that can receive power from two input elements and that, if power is received from one of the input elements, outputs power.

BACKGROUND

An example of such a power transmission device is described in Patent Literature 1. Patent Literature 1 relates to a lens tube of a camera capable of both automatic focus adjustment by an ultrasonic motor and manual focus adjustment by manual operation. The lens tube has an intermediate gear member between a driving member that is rotated by the ultrasonic motor and an operation member that is rotated by manual operation. Those components together form a planetary gear mechanism in which the intermediate gear member is a planetary gear, the driving member is a ring gear, and the operation member is a sun gear. The carrier of the intermediate gear member is connected to a lens driving tube which is a power receiving component.

In a lens tube having the above configuration, when the ultrasonic motor is driven or when the operation member is rotated, the intermediate gear member is rotated about the sun gear and, via the carrier, the lens driving tube is rotated, which enables focus adjustment.

CITATION LIST

Patent Literature

Patent Literature 1: Japanese Patent Application Laid-open No. H10-115760

SUMMARY

Technical Problem

When the ultrasonic motor is driven and when the operation member is rotated, it is necessary to stop rotation of the other in order to rotate the intermediate gear member about the sun gear. Therefore, in the lens tube described in Patent Literature 1, an engagement member capable of engaging with the operation member is provided for the non-rotating member. When the ultrasonic motor is driven with the engagement member engaged with the operation member, by rotation of the driving member, the intermediate gear member is rotated about the sun gear.

When, in contrast, the operation member is rotated, rotation of the driving member is thwarted by a frictional force that is generated, when no electricity is applied, between a stator and a rotor of the ultrasonic motor. Although the lens tube described in Patent Literature 1 is configured as described above, if a load applied to the carrier of the intermediate gear member is small, there is a possibility that rotation of the operation member can rotate the carrier. Patent Literature 1 has a problem in that the motor used therefor is limited to an ultrasonic motor. Moreover, if the load applied to the carrier increases, there is a possibility that the intermediate gear member does not rotate about the sun gear but rotates about the shaft center thereof and, in turn, the driving member is rotated, which makes it difficult to rotate the lens driving tube.

The above described problems are solvable by adding a means to thwart the rotation of the driving member. However, such an additional means to thwart the rotation of the driving member drastically increases the loss of torque of the motor, increases the manufacturing cost, and makes downsizing of the power transmission device difficult.

The present invention has been achieved to solve the above problems and it is an object of the present invention to provide a power transmission device that can transmit power more reliably but does not increase the manufacturing cost nor make size reduction difficult.

Solution to Problem

To achieve the above described object a power transmission device of the present invention includes: a first gear member that is rotatably attached about a shaft center thereof; an intermediate gear member that is meshed with the first gear member and rotatably supported about both a shaft center thereof and the shaft center of the first gear member; a second gear member that is rotatably attached about the shaft center of the first gear member and meshed with the intermediate gear member via a gear part; a third gear member that is rotatably attached about the shaft center of the first gear member and meshed with the intermediate gear member via a gear part having a number of teeth different from a number of teeth of the gear part of the second gear member; an input gear member that is rotatably attached about a shaft center thereof; and a clutch mechanism that is between the input gear member and the second gear member, wherein when the input gear member rotates, the clutch mechanism rotates the second gear member and when the second gear member rotates, the clutch mechanism disconnects transmission of power to the input gear member, and the first gear member and the second gear member are individual input elements and when either the first gear member or the second gear member rotates, the third gear member is rotated in accordance with the rotation.

In one or more embodiments, a power transmission device further includes a load applying unit that applies a load to the input gear member, and the clutch mechanism includes: a frictional power transmission unit that is between the input gear member and the second gear member and transmits a torque via a pair of friction contact surfaces that are in contact with each other, and a pressing member that causes the friction contact surfaces to be in press-contact with each other, and when the input gear member rotates, the pressing member connects the friction contact surfaces to each other, thereby rotating the second gear member and when the second gear member rotates, the pressing member causes the friction contact surfaces to rotate in a relative rotation manner by the load received from the load applying unit.

In one or more embodiments, the load applying unit includes: a fourth gear member that is meshed with the input gear member, and a rotation restricting member that presses the fourth gear member in a shaft direction, thereby restricting rotation of the fourth gear member.

In one or more embodiments, the friction power transmission unit includes: a first clutch gear member that is meshed with the input gear member, wherein an end surface thereof is a first friction contact surface, and a second clutch gear member that is meshed with the second gear member, wherein an end surface thereof is a second friction contact surface.

In one or more embodiments, the load applying unit includes: a fourth gear member that is meshed with the input gear member, and a rotation restricting member that presses the fourth gear member in a shaft direction, thereby restricting rotation of the fourth gear member, and the clutch mechanism includes: a first clutch gear member that is meshed with the input gear member, wherein an end surface thereof is a first friction contact surface; a second clutch gear member that is meshed with the second gear member, wherein an end surface thereof is a second friction contact surface, and a pressing member that causes the friction contact surfaces to be in press-contact with each other, wherein when the input gear member rotates, the pressing member connects the friction contact surfaces to each other, thereby rotating the second gear member and when the second gear member rotates, the pressing member causes the friction contact surfaces to rotate in a relative rotation manner by the load received from the load applying unit.

Advantageous Effects of Invention

According to the present invention, a first gear member, an intermediate gear member, a second gear member, and a third gear member together form what is called a paradox gear mechanism. Because a paradox gear mechanism is less efficient than a typical planetary gear mechanism, the paradox gear mechanism can stop, when the second gear member is rotated, rotation of the first gear member more reliably without an additional means to stop the rotation of the first gear member. Therefore, the paradox gear mechanism can transmit the power more reliably without an increase of manufacturing cost and without disturbing downsizing of the product. Moreover, because a clutch mechanism is disposed between an input gear member and the second gear member, when the first gear member is rotated, the input gear member is prevented from rotating.

DESCRIPTION OF EMBODIMENT

Exemplary embodiments of a power transmission device according to the present invention are described in detail below with reference to the accompanying drawings.

Figure 1:
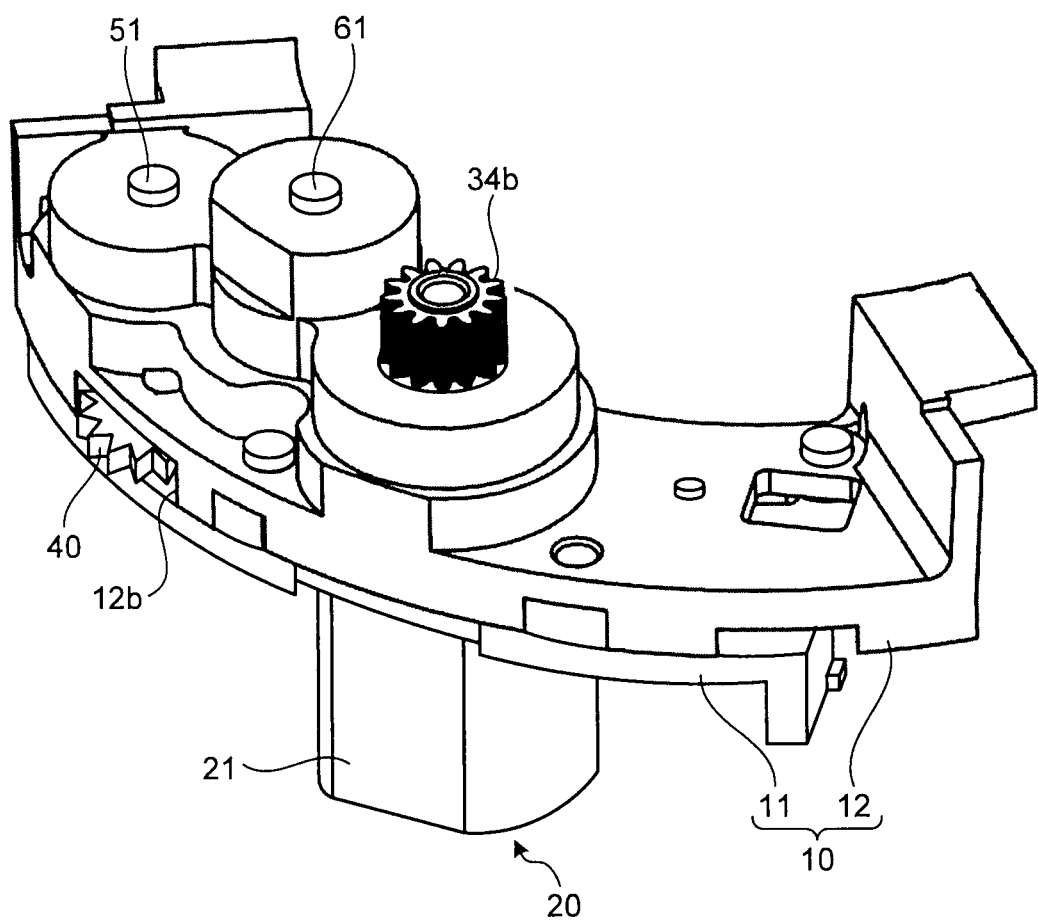
FIG. 1 is a conceptual perspective view of the appearance of a power transmission device according to an embodiment of the present invention.
Figure 2:
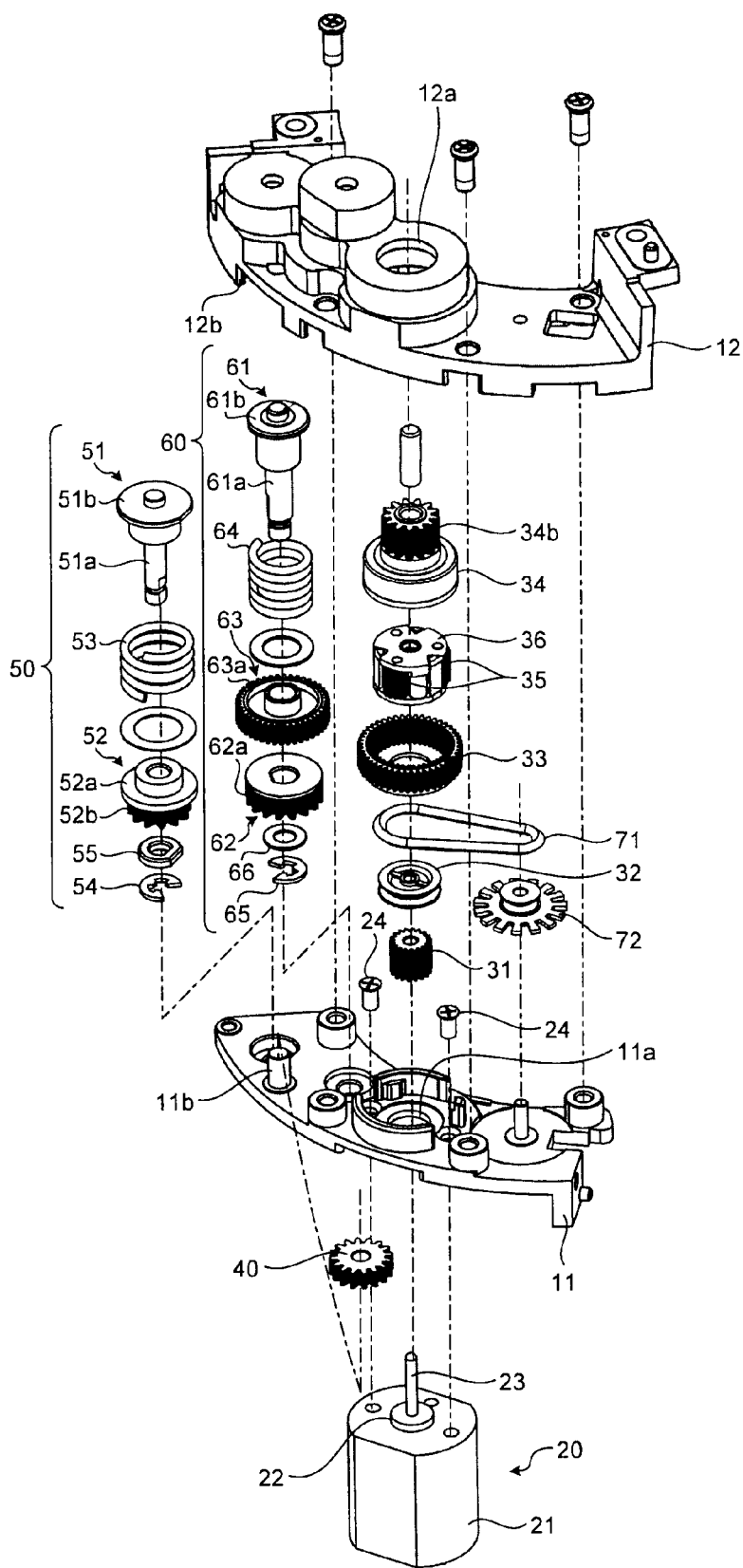
FIG. 2 is an exploded perspective view of the power transmission device illustrated in FIG. 1.
Figure 3:
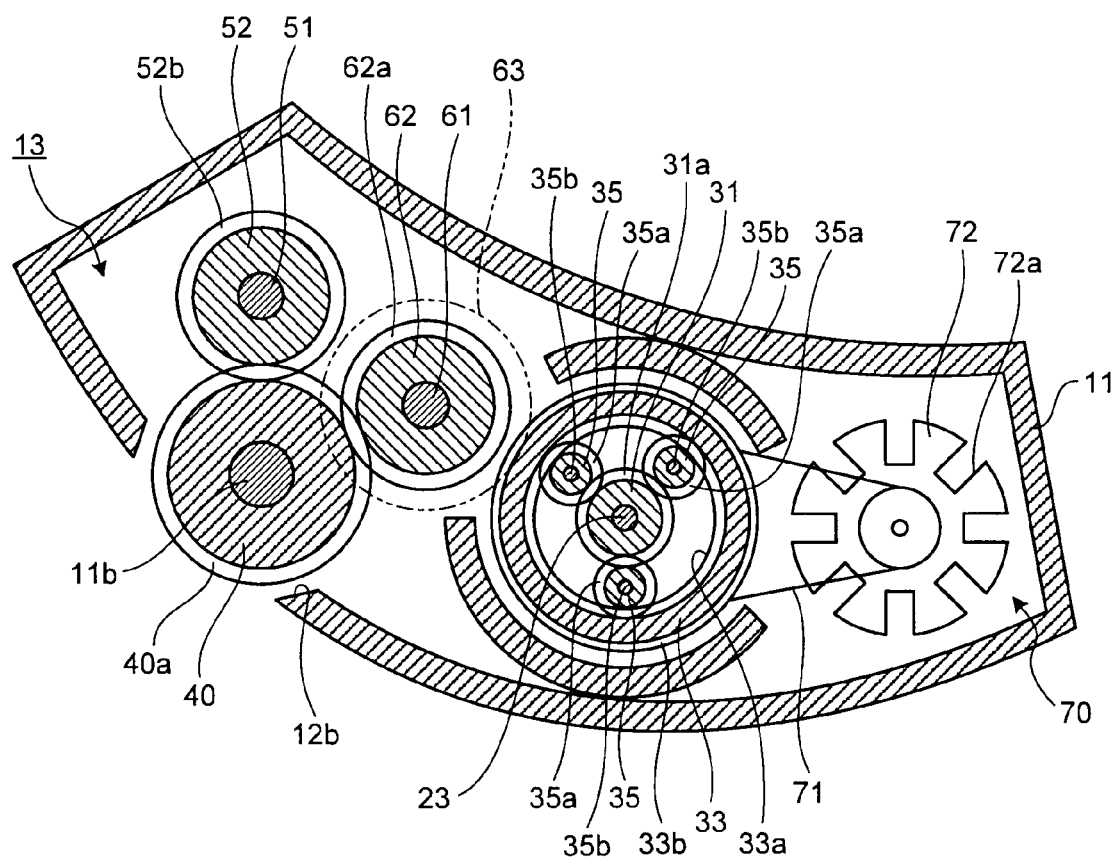
FIG. 3 is a conceptual flat view of the power transmission system of the power transmission device illustrated in FIG. 1.
Figure 4:
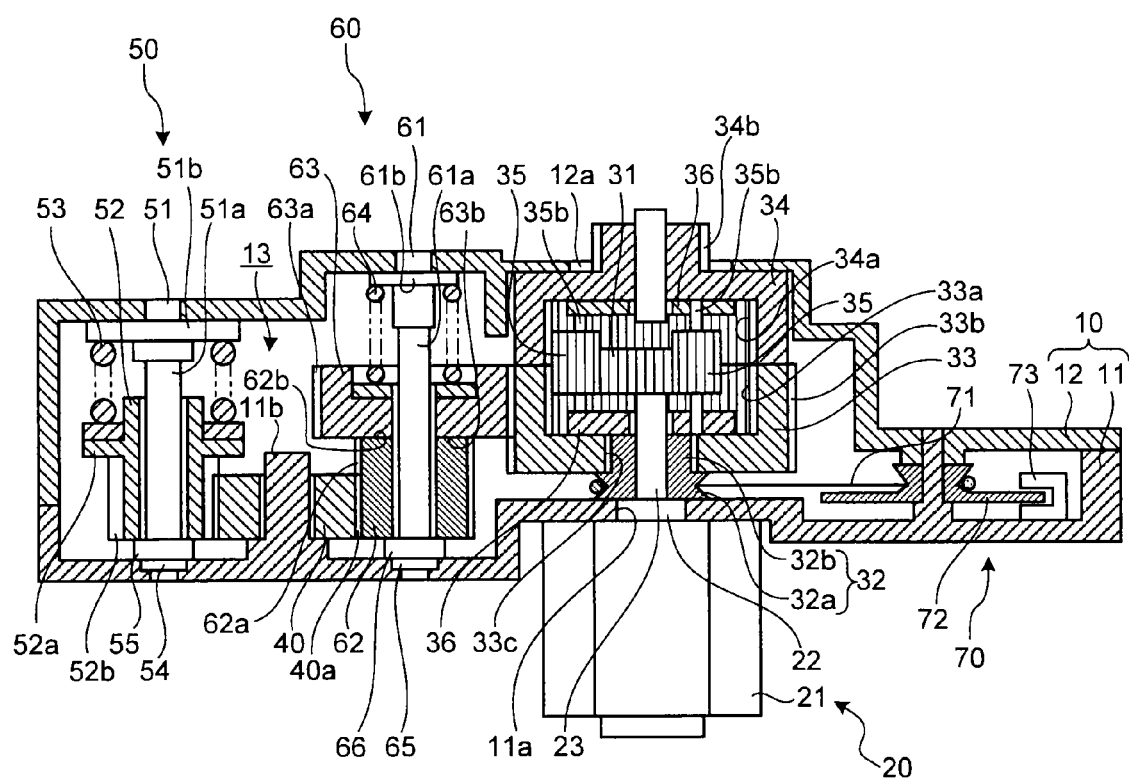
FIG. 4 is a conceptual cross-sectional view of the power transmission system of the power transmission device illustrated in FIG. 1.

FIGS. 1 to 4 illustrate a power transmission device according to an embodiment of the present invention. The power transmission device illustrated as an example enables a lens tube having what is called an autofocus function to conduct both automatic focus adjustment by using a motor and manual focus adjustment by manual operation. The power transmission device has a body housing 10. The body housing 10 includes a base plate 11 and a cover member 12, thereby defining an accommodation space 13 between the base plate 11 and cover member 12.

A motor 20 is attached to the body housing 10 on the outer surface of the base plate 11. The motor 20 includes a protruding part 22 and a driving shaft 23 which are provided on an end surface of a body casing 21. The motor 20 is supported by the base plate 11 by using a fixing screw 24 via the body casing 21 in such a manner that the driving shaft 23 is accommodated in the accommodation space 13 of the body housing 10; and the protruding part 22 is engaged with an engagement hole 11a that is formed on the base plate 11. The accommodation space 13 of the body housing 10 accommodates therein a sun gear member (first gear member) 31, a driving pulley 32, a first ring gear member (second gear member) 33, a second ring gear member (third gear member) 34, and planetary gear members (intermediate gear members) 35.

The sun gear member 31 is a spur gear having an outer gear part 31a on the outer circumference. The sun gear member 31 is fixed to the driving shaft 23 of the motor 20 in such a manner that the shaft centers of the sun gear member 31 and driving shaft 23 are aligned to conform to each other.

The driving pulley 32 is fixed to the driving shaft 23 of the motor 20 and is disposed between the protruding part 22 and the sun gear member 31. The driving pulley 32 includes a belt winding part 32a and a rotary supporting part 32b. The belt winding part 32a is a large diameter disk-shaped part having a V-shaped groove on the outer circumference. The belt winding part 32a is disposed at a position on the driving shaft 23 close to the protruding part 22. The rotary supporting part 32b is a cylindrical part having a diameter smaller than that of the belt winding part 32a. The rotary supporting part 32b is disposed at a position on the driving shaft 23 close to the sun gear member 31.

The first ring gear member 33 is shaped like a cylinder with a bottom and includes an inner gear part 33a on the inner circumference and an outer gear part 33b on the outer circumference. The first ring gear member 33 has a sliding hole 33c formed on the bottom thereof and is slidably engaged with the rotary supporting part 32b of the driving pulley 32 at the sliding hole 33c. With this configuration, the first ring gear member 33 can rotate, with respect to the driving shaft 23 and the driving pulley 32, about the shaft center of the driving shaft 23.

The second ring gear member 34 is shaped like a cylinder with a bottom and has an inner gear part 34a on the inner circumference and an output gear part 34b at a position that is on the outer surface of the bottom and on the shaft axis thereof. In comparison with the first ring gear member 33, the second ring gear member 34 is configured to have a slightly smaller outer diameter and substantially the same inner diameter. The number of the teeth of the inner gear part 34a is configured to be different from the number of the teeth of the inner gear part 33a of the first ring gear member 33. The second ring gear member 34 is attached to the cover member 12 in such a manner that the opening of the second ring gear member 34 faces the opening of the first ring gear member 33 and the output gear part 34b is exposed to outside through a gear insertion hole 12a of the cover member 12. With this configuration, the second ring gear member 34 can rotate about the shaft center of the driving shaft 23. Although not illustrated in the drawings, in the present embodiment, the output gear part 34b of the second ring gear member 34 is configured to engage with an inner gear part that is provided on an inner circumference of a lens driving tube of the lens tube.

The planetary gear members 35 are spur gears, each spur gear having: an outer gear part 35a on the outer circumference thereof; and an integrally structured shaft 35b. Three planetary gear members 35 are provided, surrounding the sun gear member 31. The planetary gear members 35 are supported by a carrier 36 via the respective shafts 35b in such a manner that the respective shaft centers of the planetary gear members 35 are parallel to the shaft center of the driving shaft 23 and spaced apart equally from each other. Each planetary gear member 35 is meshed, via the outer gear part 35a, with: the outer gear part 31a of the sun gear member 31; the inner gear part 33*a* of the first ring gear member 33; and the inner gear part 34*a* of the second ring gear member 34. With this configuration, each planetary gear member 35 is rotatable with respect to the carrier 36 about the shaft center thereof; and revolutable about the sun gear member 31 as the carrier 36 rotates about the shaft center of the driving shaft 23.

The above power transmission device further includes an input gear member 40, a load applying unit 50, and a clutch mechanism 60, which are arranged in the accommodation space 13 of the body housing 10.

The input gear member 40 is a spur gear having an outer gear part 40*a* on the outer circumference thereof.

The input gear member 40 is rotatably supported by an input shaft member 11*b* that is provided on the base plate 11. A part of the outer gear part 40*a* of the input gear member 40 is in a state being exposed to outside of the body housing 10 through a notch 12*b* that is formed on the cover member 12; therefore, the input gear member 40 is meshable with a gear (not illustrated) that is arranged outside of the body housing 10. Although not illustrated, in the present embodiment, the outer gear part 40*a* of the input gear member 40 is meshed with an inner gear part that is provided on the inner circumference of a manual focus ring of the lens tube.

The load applying unit 50 is configured to apply a load to the input gear member 40, thereby restricting rotation of the input gear member 40. In the present embodiment, the load applying unit 50 is configured by disposing a brake gear member (fourth gear member) 52 and a brake spring (rotation restricting member) 53 to a shaft portion 51*a* of a brake shaft 51. The brake shaft 51 is a shaft member having a flange 51*b* at one end and a snap ring 54 and a washer member 55 mounted at the other end. The brake gear member 52 is a spur gear having a flange 52*a* at one end and an outer gear part 52*b* attached on the outer circumference of the other end. The brake gear member 52 is attached to the shaft portion 51*a* of the brake shaft 51 between the flange 51*b* and the snap ring 54 in such a manner that the brake gear member 52 is rotatable and movable in the shaft direction. The brake spring 53 is a coil spring that is, being compressed, between the flange 51*b* of the brake shaft 51 and the flange 52*a* of the brake gear member 52 and then presses, by an elastic restoring force, an end surface of the brake gear member 52 against the washer member 55.

The load applying unit 50, via the brake shaft 51, is disposed between the base plate 11 and the cover member 12 in such a manner that the shaft center of the brake shaft 51 is parallel to the shaft center of the input shaft member 11*b*; and is disposed in a state the outer gear part 52*b* of the brake gear member 52 is meshed with the outer gear part 40*a* of the input gear member 40.

The clutch mechanism 60 is disposed between the input gear member 40 and the first ring gear member 33 and is used to disconnect transmission of power between the input gear member 40 and first ring gear member 33. In the present invention, the clutch mechanism 60 is configured by allocating a first clutch gear member 62, a second clutch gear member 63, and a clutch spring (pressing member) 64 to a shaft portion 61*a* of a clutch shaft 61. The clutch shaft 61 is a shaft member having a flange 61*b* disposed at one end and a snap ring 65 and a washer member 66 mounted at the other end. The first clutch gear member 62 and the second clutch gear member 63 are spur gears having outer gear portions 62*a* and 63*a*, respectively on the respective outer circumferences and have friction contact surfaces 62*b* and 63*b*, respectively formed on respective end surfaces. The first clutch gear member 62 and the second clutch gear member 63, in such a state the friction contact surfaces 62*b* and 63*b* face each other and the first clutch gear member 62 faces the washer member 66, are rotatably disposed to the shaft portion 61*a* of the clutch shaft 61 between the flange 61*b* and the snap ring 65 and are movably disposed in the shaft direction. The clutch spring 64 is a coil spring that is disposed, in a state being compressed, between the flange 61*b* of the clutch shaft 61 and an end surface of the second clutch gear member 63 and then presses an end surface of the first clutch gear member 62 against the washer member 66 using an elastic restoring force via the second clutch gear member 63.

The clutch mechanism 60 is disposed between the base plate 11 and the cover member 12 via the clutch shaft 61 in such a state: the shaft center of the clutch shaft 61 is parallel to the shaft center of the input shaft member 11*b*; the outer gear part 62*a* of the first clutch gear member 62 is meshed with the outer gear part 40*a* of the input gear member 40; and the outer gear part 63*a* of the second clutch gear member 63 is meshed with the outer gear part 33*b* of the first ring gear member 33.

The clutch spring 64 of the clutch mechanism 60, herein, causes, by the pressing force, the first friction contact surface 62*b* of the first clutch gear member 62 and the second friction contact surface 63*b* of the second clutch gear member 63 to be in press-contact and determines a frictional force generated between the surfaces 62*b* and 63*b*. The brake spring 53 of the load applying unit 50 is configured to press, by the pressing force thereof, the brake gear member 52 against the washer member 55, thereby applying a load to rotation of the input gear member 40 that is meshed with the brake gear member 52. In the present embodiment, the pressing force of the clutch spring 64 and the pressing force of the brake spring 53 are set to satisfy the following conditions.

(1) When the input gear member 40 is rotated and, in accordance with the rotation of the input gear member 40, the first clutch gear member 62 is rotated, the first friction contact surface 62*b* and the second friction contact surface 63*b* are interlocked with each other by the frictional force between them so that the first ring gear member 33 is rotated via the second clutch gear member 63.

(2) When the first ring gear member 33 is rotated and, in accordance with the rotation of the first ring gear member 33, the second clutch gear member 63 is rotated, a slippage is generated between the first friction contact surface 62*b* and the second friction contact surface 63*b*, the input gear member 40 to which a load is applied by the brake spring 53 and the first clutch gear member 62 that is meshed with the input gear member 40 are kept in a state rotations thereof are thwarted.

The reference numeral 70 depicted in the drawings is a rotary encoder. The rotary encoder 70 used in the present embodiment includes a disk 72 that rotates in accordance with the driving shaft 23 by means of a timing belt 71 that is wound around the belt winding part 32*a* of the driving pulley 32 and a photointerrupter 73 that optically detects a slit 72*a* that is formed on the disk 72.

In the power transmission device having the above described configuration, when the motor 20 is driven, the sun gear member 31 rotates in one direction. Under a situation described above, the second clutch gear member 63 that is meshed with the first ring gear member 33 is in a state being press-contacted with the first clutch gear member 62 by means of the clutch spring 64. Moreover, the first clutch gear member 62 is meshed with the input gear member 40 whose rotation is restricted by the load applying unit 50. As a result, when the sun gear member 31 rotates, the first clutch gear member 62 does not rotate and the planetary gear members 35 rotate about the respective shaft centers thereof, while orbiting around the sun gear. By the orbiting of the planetary gear members 35 around the sun gear, the second ring gear member 34 is rotated. By the rotation of the output gear part 34b, the lens driving tube is rotated.

When the lens driving tube that is rotated by the driving of the motor 20 reaches a stroke end, the second ring gear member 34 falls in a state that cannot rotate; therefore, when the sun gear member 31 rotates, by rotation of the planetary gear members 35 about the respective shaft centers thereof and by orbiting of the planetary gear members 35 around the sun gear, the first ring gear member 33 is rotated. However, rotation of the first ring gear member 33 is not transmitted to the first clutch gear member 62 due to the setting of the pressing force of the clutch spring 64 and the pressing force of the brake spring 53 that are set in the abovementioned manner. Therefore, while the motor 20 is being driven, the input gear member 40 does not rotate and, therefore, there is no possibility to incur a case in which the manual focus ring that is meshed with the input gear member 40 is rotated.

On the other hand, when the manual focus ring is rotated without driving the motor 20, the first clutch gear member 62 is rotated via the input gear member 40. When the first clutch gear member 62 is rotated, by means of the pressing force of the clutch spring 64 and the pressing force of the brake spring 53 that are set in the abovementioned manner, the first friction contact surface 62b becomes in a state of being connected with the second friction contact surface 63b by the frictional force. Therefore, by rotation of the input gear member 40, both the first clutch gear member 62 and the second clutch gear member 63 are rotated and, in turn, the first ring gear member 33 that is meshed with the second clutch gear member 63 is rotated.

In a state no electricity is applied to the motor 20, rotation of the rotor is in a state of being restricted by a magnetic force and a frictional force exerted between the stator and the rotor, i.e., rotation of the sun gear member 31 that is fixed to the driving shaft 23 is in a state of being restricted. Moreover, according to the above described power transmission device, the sun gear member 31, the planetary gear members 35, the first ring gear member 33, and the second ring gear member 34 form together what is called a paradox gear mechanism. Because a paradox gear mechanism is less efficient than a typical planetary gear mechanism, this mechanism can thwart, when the first ring gear member 33 is rotated, rotation of the sun gear member 31 more reliably without an additional means being necessary to thwart the rotation of the sun gear member 31. With this configuration, even if the load that is applied to the lens driving tube is large, the sun gear member 31 cannot be rotated by rotation of the first ring gear member 33 and the planetary gear members 35 rotate about the respective shaft centers thereof while orbiting around the sun gear. By the orbiting of the planetary gear members 35 around the sun gear, the second ring gear member 34 is rotated. By the rotation of the output gear part 34b, the lens driving tube is rotated more reliably.

Moreover, because the above power transmission device has the paradox gear mechanism as described above, the power transmission device has a large reduction gear ratio without using an additional gear train and can prevent an increase in the size and the weight of the lens tube to be applied.

Although the above embodiment describes, as an example, the power transmission device that is used in the lens tube and that is capable of both the automatic focus adjustment by using the motor 20 and the manual focus adjustment by manual operation, the power transmission device is not limited thereto so long as it can receive power from two input elements and configured to output power when receiving power from only one of the input elements.

Moreover, although, in the above embodiment, the load applying unit 50 applies the load to the input gear member 40 via the brake gear member 52, it can be configured to apply the load directly to the input gear member 40.

REFERENCE SIGNS LIST

20 MOTOR
23 DRIVING SHAFT
31 SUN GEAR MEMBER
33 FIRST RING GEAR MEMBER
34 SECOND RING GEAR MEMBER
34b OUTPUT GEAR PART
35 PLANETARY GEAR MEMBER
40 INPUT GEAR MEMBER
50 LOAD APPLYING UNIT
52 BRAKE GEAR MEMBER
53 BRAKE SPRING
60 CLUTCH MECHANISM
62 FIRST CLUTCH GEAR MEMBER
62b FIRST FRICTION CONTACT SURFACE
63 SECOND CLUTCH GEAR MEMBER
63b SECOND FRICTION CONTACT SURFACE
64 CLUTCH SPRING

The invention claimed is:

1. A power transmission device comprising:
a first gear member that is rotatably attached about a shaft center of the first gear member;
an intermediate gear member that is meshed with the first gear member and rotatably supported about both a shaft center of the intermediate gear member and the shaft center of the first gear member;
a second gear member that is rotatably attached about the shaft center of the first gear member and has a gear part that is meshed with the intermediate gear member;
a third gear member that is rotatably attached about the shaft center of the first gear member and has a gear part that is meshed with the intermediate gear member, wherein the gear part of the third gear member has a number of teeth different from a number of teeth of the gear part of the second gear member;
an input gear member that is rotatably attached about a shaft center of the input gear member;
a load applying unit that applies a load to the input gear member, thereby restricting rotation of the input gear member; and
a clutch mechanism that is between the input gear member and the second gear member, wherein the clutch mechanism includes:
a frictional power transmission unit that is between the input gear member and the second gear member and transmits a torque via a pair of first and second friction contact surfaces that are in contact with each other, and
a pressing member that causes the first and second friction contact surfaces to be in press-contact with each other, wherein when the input gear member rotates, the pressing member connects the first and second friction contact surfaces to each other, thereby rotating the second gear member, and when the second gear member rotates, the load applying unit restricts rotation of the input gear member such that the pressing member causes the first and second friction contact surfaces to rotate in a relative rotation manner, wherein
the first gear member and the second gear member are individual input elements and when either the first gear member or the second gear member rotates, the third gear member is rotated in accordance with the rotation of either the first gear member or the second gear member.

2. The power transmission device according to claim 1, wherein the load applying unit includes:
   a fourth gear member that is meshed with the input gear member, and
   a rotation restricting member that presses the fourth gear member in an axial direction of a shaft of the fourth gear member, thereby restricting rotation of the fourth gear member.

3. The power transmission device according to claim 1, wherein the friction power transmission unit includes:
   a first clutch gear member that is meshed with the input gear member, wherein an end surface thereof is the first friction contact surface, and
   a second clutch gear member that is meshed with the second gear member, wherein an end surface thereof is the second friction contact surface.

4. The power transmission device according to claim 1, wherein the load applying unit includes:
   a fourth gear member that is meshed with the input gear member, and
   a rotation restricting member that presses the fourth gear member in an axial direction of a shaft of the fourth gear member, thereby restricting rotation of the fourth gear member, and the friction power transmission unit includes
   a first clutch gear member that is meshed with the input gear member, wherein an end surface thereof is the first friction contact surface, and
   a second clutch gear member that is meshed with the second gear member, wherein an end surface thereof is the second friction contact surface.

* * * * *